United States Patent
Hatta

(10) Patent No.: US 12,492,288 B2
(45) Date of Patent: Dec. 9, 2025

(54) PERFLUOROPOLYETHER COMPOUND, AND LUBRICANT AND MAGNETIC DISK EACH USING SAME

(71) Applicant: Moresco Corporation, Kobe (JP)

(72) Inventor: Tomomi Hatta, Kobe (JP)

(73) Assignee: Moresco Corporation, Kobe (JP)

(*) Notice: Subject to any disclaimer, the term of this patent is extended or adjusted under 35 U.S.C. 154(b) by 0 days.

(21) Appl. No.: 18/834,034

(22) PCT Filed: Jan. 20, 2023

(86) PCT No.: PCT/JP2023/001618
§ 371 (c)(1),
(2) Date: Jul. 29, 2024

(87) PCT Pub. No.: WO2023/145625
PCT Pub. Date: Aug. 3, 2023

(65) Prior Publication Data
US 2025/0122336 A1    Apr. 17, 2025

(30) Foreign Application Priority Data
Jan. 31, 2022    (JP) .................. 2022-013797

(51) Int. Cl.
*C08G 65/00* (2006.01)
*C10M 107/38* (2006.01)
(Continued)

(52) U.S. Cl.
CPC ......... *C08G 65/007* (2013.01); *C10M 107/38* (2013.01); *G11B 5/7257* (2020.08);
(Continued)

(58) Field of Classification Search
CPC .............. C08G 65/007; C08G 2650/38; C08G 2650/48; C10M 107/38; C10M 2213/043; G11B 5/7257; C10N 2040/18
See application file for complete search history.

(56) References Cited

U.S. PATENT DOCUMENTS

| 2010/0239887 A1 | 9/2010 | Kobayashi |
| 2014/0147699 A1 | 5/2014 | Kobayashi |

(Continued)

FOREIGN PATENT DOCUMENTS

| WO | 2009066784 A1 | 5/2009 |
| WO | 2021002178 A1 | 1/2021 |

(Continued)

OTHER PUBLICATIONS

International Search Report from PCT Application No. PCT/JP2023/001618 dated Mar. 20, 2023.
(Continued)

*Primary Examiner* — Taiwo Oladapo
(74) *Attorney, Agent, or Firm* — Harness Dickey & Pierce P.L.C.

(57) ABSTRACT

Provided is a perfluoropolyether compound that has a high degree of solubility in a fluorine-based solvent, has high heat resistance, and exhibits a strong interaction with magnetic disks. A perfluoropolyether compound having a structure represented by formula (1):

$$R^1-CH_2-Rf-(L-Rf)_p-CH_2-R^2 \quad (1)$$

In formula (1), Rf is a perfluoropolyether group, $R^1$ and/or $R^2$ is/are a group having a structure represented by formula (2), and an OH group is further present between Rf and a molecular terminal.

(Continued)

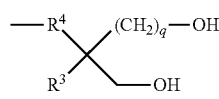

(2)

15 Claims, 1 Drawing Sheet

(51) Int. Cl.
*G11B 5/725* (2006.01)
*C10N 40/18* (2006.01)

(52) U.S. Cl.
CPC ..... *C08G 2650/38* (2013.01); *C08G 2650/48* (2013.01); *C10M 2213/043* (2013.01); *C10N 2040/18* (2013.01)

(56) References Cited

U.S. PATENT DOCUMENTS

| 2022/0275305 | A1 | 9/2022 | Shimizu |
| 2022/0372395 | A1 | 11/2022 | Tomomi et al. |
| 2024/0101759 | A1* | 3/2024 | Yagyu .................... G11B 5/725 |

FOREIGN PATENT DOCUMENTS

| WO | 2021024585 | 2/2021 |
| WO | 2022131202 | 6/2022 |

OTHER PUBLICATIONS

Written Opinion from PCT Application No. PCT/JP2023/001618 dated Mar. 20, 2023.
Office Action from Japanese Application No. 2023-576860 dated May 7, 2025.

* cited by examiner

PERFLUOROPOLYETHER COMPOUND, AND LUBRICANT AND MAGNETIC DISK EACH USING SAME

PRIORITY STATEMENT

This application is a national stage application under 35 U.S.C. § 371 of PCT International Application No. PCT/JP2023/001618, which has an international filing date of 20 Jan. 2023 and claims priority under 35 U.S.C. § 119 to Japan Patent Application No. 2022-013797 filed on 31 Jan. 2022. The contents of each application recited above are incorporated herein by reference in their entirety.

TECHNICAL FIELD

The present invention relates to a perfluoropolyether compound, and a lubricant and a magnetic disk each using the same.

BACKGROUND ART

Many of existing magnetic disks are each constituted by: a recording layer disposed on a substrate; a protective layer disposed on the recording layer in order to protect information recorded on the recording layer; and a lubricant layer disposed on the protective layer. In recent years, lubricants for magnetic disks have been reduced in molecular weight to improve performance. The reduction in molecular weight of a lubricant makes it more likely that scattering and volatilization of the lubricant occur during high-speed rotation of a magnetic disk. In order to prevent or reduce scattering and volatilization of the lubricant, a lubricant that exhibits a strong interaction with magnetic disks is required.

The inventors of the present invention have developed lubricants having excellent durability or excellent heat resistance in order to adapt to an increased rotation speed of a disk and a decreased clearance of a magnetic head (see, for example, Patent Literatures 1 and 2).

CITATION LIST

Patent Literature

[Patent Literature 1] International Publication No. WO 2009/066784
[Patent Literature 2] International Publication No. WO 2021/002178

SUMMARY OF INVENTION

Technical Problem

However, the above-described techniques have room for further improvement in heat resistance and interaction with a magnetic disk. In addition, the lubricant disclosed in the Literature 2 of the prior art has room for improvement in solubility in a fluorine-based solvent. An object of the present invention is to provide a perfluoropolyether compound that has excellent heat resistance, exhibits a strong interaction with a magnetic disk, and has a high degree of solubility in a fluorine-based solvent.

Solution to Problem

As a result of conducting diligent studies to attain the above object, the inventors of the present invention made a novel finding that, by introducing a specific number of OH groups at a specific position of a perfluoropolyether compound, it is possible to attain the above object, and eventually completed the present invention.

An aspect of the present invention includes the following configurations.

A perfluoropolyether compound having a structure represented by formula (1):

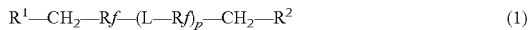

$$R^1-CH_2-Rf-(L-Rf)_p-CH_2-R^2 \quad (1)$$

where Rf is a perfluoropolyether group,
L is a linking group being composed of a $C_3$-$C_{20}$ hydrocarbon group having an OH group, at least one carbon atom in a main chain of the $C_3$-$C_{20}$ hydrocarbon group is optionally substituted with an oxygen atom, and p is 0 or 1, and
$R^1$ is a group having a structure represented by formula (2):

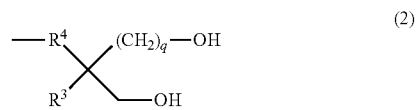

(2)

where $R^4$ is a $C_3$-$C_{10}$ hydrocarbon group having an OH group, at least one carbon atom in a main chain of the $C_3$-$C_{10}$ hydrocarbon group is optionally substituted with an oxygen atom, $R^3$ is a hydrogen atom or a $C_1$-$C_2$ hydrocarbon group, q is an integer of 2 to 10 when $R^3$ is a hydrogen atom, and q is an integer of 1 to 10 when $R^3$ is a $C_1$-$C_2$ hydrocarbon group, and
$R^2$ is a group having the structure represented by the formula (2) or a group having a structure represented by formula (3):

$$-R^5-OH \quad (3)$$

where $R^5$ is a $C_3$-$C_{10}$ hydrocarbon group having an OH group, and at least one carbon atom in a main chain of the $C_3$-$C_{10}$ hydrocarbon group is optionally substituted with an oxygen atom.

Advantageous Effects of Invention

According to an aspect of the present invention, it is possible to provide a perfluoropolyether compound that has excellent heat resistance, exhibits a strong interaction with a magnetic disk, and has a high degree of solubility in a fluorine-based solvent.

DESCRIPTION OF EMBODIMENTS

Figure 1:
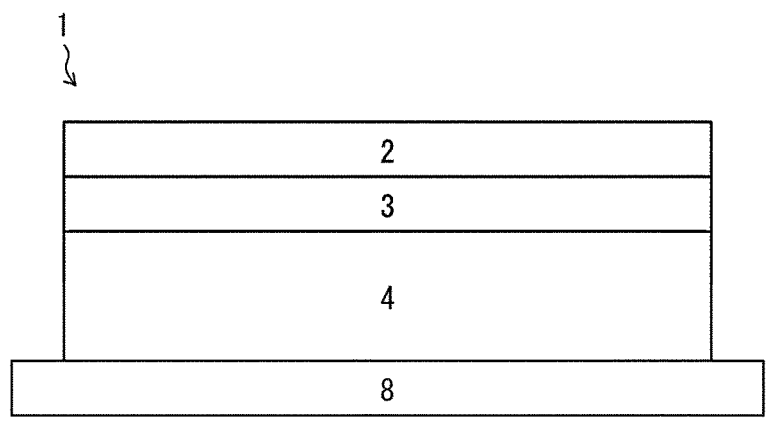
FIG. 1 is a cross-sectional view illustrating a configuration of a magnetic disk in accordance with an embodiment of the present invention.

The following description will discuss embodiments of the present invention in detail. Note, however, that the present invention is not limited to the embodiments, but can be altered within this disclosure. The present invention also encompasses, in its technical scope, any embodiment derived by combining technical means disclosed in differing embodiments. Note that the expression "A to B", representing a numerical range, herein means "not less than A and not more than B" unless otherwise specified in the present specification.

1. Perfluoropolyether Compound

A perfluoropolyether compound in accordance with an aspect of the present invention has a structure represented by the following formula (1):

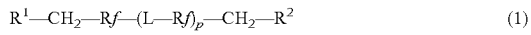

where Rf is a perfluoropolyether group, L is a linking group being composed of a $C_3$-$C_{10}$ hydrocarbon group having an OH group, at least one carbon atom in a main chain of the $C_3$-$C_{10}$ hydrocarbon group is optionally substituted with an oxygen atom, p is 0 or 1, and $R^1$ is a group having a structure represented by formula (2):

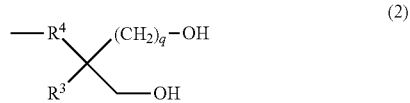

where $R^4$ is a $C_3$-$C_{10}$ hydrocarbon group having an OH group, at least one carbon atom in a main chain of the $C_3$-$C_{10}$ hydrocarbon group is optionally substituted with an oxygen atom, $R^3$ is a hydrogen atom or a $C_1$-$C_2$ hydrocarbon group, q is an integer of 2 to 10 when $R^3$ is a hydrogen atom, and q is an integer of 1 to 10 when $R^3$ is a $C_1$-$C_2$ hydrocarbon group.

$R^2$ is a group having the structure represented by the formula (2) or a group having a structure represented by formula (3):

where $R^5$ is a $C_3$-$C_{10}$ hydrocarbon group having an OH group, and at least one carbon atom in a main chain of the $C_3$-$C_{10}$ hydrocarbon group is optionally substituted with an oxygen atom.

The perfluoropolyether compound in accordance with an aspect of the present invention has the above-described structure, and thus has two primary OH groups at one terminal of the perfluoropolyether compound, has one or two primary OH groups at the other terminal thereof (i.e., three or four primary OH groups in total at the terminals of the perfluoropolyether compound), and has OH groups which are present at the inside of a molecule than the primary OH groups at the both terminals, in other words, between the perfluoropolyether groups and the primary OH groups at molecular terminals. With such a structure, the perfluoropolyether compound realizes excellent heat resistance, a strong interaction with a magnetic disk, and excellent solubility in a fluorine-based solvent. Here, the interaction with the magnetic disk is intended to mean an interaction between the perfluoropolyether compound and a surface with which a lubricant of a magnetic disk comes into contact. Therefore, in a case where the lubricant layer is formed on a protective layer for protecting information recorded in a recording layer, the interaction with the magnetic disk is intended to mean the interaction with the protective layer.

The perfluoropolyether compound in accordance with an aspect of the present invention having OH groups which are present at the inside of a molecule than the primary OH groups at the both terminals may make it possible to further enhance an interaction with a magnetic disk.

Rf in the formula (1) is not particularly limited, provided that Rf is a perfluoropolyether group. Rf in the formula (1) is exemplified, as a preferable example thereof, by a perfluoropolyether group represented by formula (4):

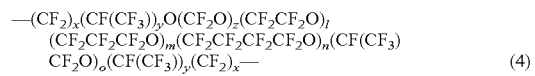

In the formula (4), x is a real number of 0 to 3, y is a real number of 0 to 1, and z, l, m, n, and o are each independently a real number of 0 to 30, and more preferably a real number of 0 to 15. Note, however, that any one of x and y is a real number of 1 or more, and any one of z, l, m, n, and o is a real number of 1 or more.

Examples of the Rf include a group containing a Demnum skeleton (C3 backbone): —$(CF_2CF_2CF_2O)_m$—, a Fomblin skeleton (C1C2 skeleton): —$(CF_2O)_z(CF_2CF_2O)_l$—, a C2 skeleton: —$(CF_2CF_2O)_l$—, a C4 skeleton: —$(CF_2CF_2CF_2CF_2O)_n$—, and a Krytox skeleton: —$(CF(CF_3)CF_2O)_o$—.

More preferable examples of the Rf include a group in which, in the formula (4), x is a real number of 0 to 3, and y is a real number of 0 to 1, where any one of x and y is a real number of 1 or more, and z, l, m, n, and o satisfy any of the following (i) to (v):

(i) m=a real number of 1 to 30, and z, l, n, and o=0;
(ii) z=l=a real number of 1 to 30, and m, n, and o=0;
(iii) l=a real number of 1 to 30, and z, m, n, and o=0;
(iv) n=a real number of 1 to 30, and z, l, m, and o=0; and
(v) o=a real number of 1 to 30, and z, l, m, and n=0.

Note that, in the Fomblin skeleton, $CF_2O$ and $CF_2CF_2O$ can be randomly repeated. Above all, still more preferable examples of the Rf include a group in which, in the formula (4), x is a real number of 0 to 3, and y is a real number of 0 to 1, where any one of x and y is a real number of 1 or more, and z, l, m, n, and o satisfy the (i) or the (ii) above. Particularly preferable examples of the Rf include a group of the (i) (Demnum skeleton), from the viewpoint of heat resistance.

In the formula (1), $R^1$ is a group having the structure represented by the formula (2). In the formula (2), $R^4$ is a $C_3$-$C_{10}$ hydrocarbon group having an OH group, at least one carbon atom in a main chain of the $C_3$-$C_{10}$ hydrocarbon group is optionally substituted with an oxygen atom.

The $C_3$-$C_{10}$ hydrocarbon group may be a linear hydrocarbon group or a branched hydrocarbon group. Further, the $C_3$-$C_{10}$ hydrocarbon group may be a saturated or an unsaturated hydrocarbon group, and is more preferably a saturated hydrocarbon group. The lower limit of the number of carbon atoms in the $C_3$-$C_{10}$ hydrocarbon group may be 3, and is more preferably 4, and even more preferably 5. Further, the upper limit of the number of carbon atoms in the $C_3$-$C_{10}$ hydrocarbon group may be 10, and is more preferably 7, and even more preferably 6. Note, here, that the number of carbon atoms in the $C_3$-$C_{10}$ hydrocarbon group includes a carbon atom substituted with an oxygen atom.

$R^4$ in the formula (2) has an OH group. It is therefore possible to further enhance the interaction between the perfluoropolyether compound and a magnetic disk. The number of OH groups contained in $R^4$ is preferably 1 to 5. The upper limit of the number of OH groups contained in $R^4$ is more preferably 3, and still more preferably 2. It is preferable that the number of OH groups contained in $R^4$ be not more than 5 because favorable solubility in a fluorine-based solvent is achieved.

The OH group contained in $R^4$ may be any of a primary OH group, a secondary OH group, and a tertiary OH group or a combination of two or more of these OH groups. The OH group contained in $R^4$ more preferably contains a secondary OH group from the viewpoint of being able to be easily produced at a high yield. The OH group contained in $R^4$ preferably contains a primary OH group from the viewpoint of enhancing the interaction between the perfluoropolyether compound and a magnetic disk.

The secondary OH group may be bonded to a carbon atom in the main chain of the hydrocarbon group constituting $R^4$. In a case where $R^4$ has a side chain, the secondary OH group may be bonded to the side chain. The secondary OH group is more preferably bonded to the carbon atom in the main chain of the hydrocarbon group constituting $R^4$ from the viewpoint of being able to be easily produced at a high yield.

In a case where the OH group is a primary OH group, the primary OH group can be contained in the form of an OH group in a hydroxyalkyl group bonded to a carbon atom in the main chain of the hydrocarbon group or in the side chain thereof. Examples of the hydroxyalkyl group include, but are not limited to, a hydroxymethyl group, a hydroxyethyl group, a hydroxypropyl group, and the like.

At least one carbon atom in the main chain of the hydrocarbon group is optionally substituted with an oxygen atom. The number of oxygen atoms with which the carbon atom(s) in the main chain is/are substituted, that is, the number of ether groups contained in the main chain, is 1 to 5, and more preferably 1 to 3.

$R^4$ in the formula (2) may have the above-described configuration. More preferable examples of $R^4$ in the formula (2) can include a group in which at least one hydrogen atom of —$(CH_2)_r$— of the structure represented by formula (5-1) below is substituted with an OH group. Note that the oxygen atom at a terminal in the formula (5-1) below is bonded to a methylene group that binds to the perfluoropolyether group of the formula (1).

—O—$(CH_2)_r$—O—$(CH_2)_s$—  (5-1)

In the formula (5-1), r is 1 to 7, and s is 0 to 2. In the formula (5-1), r is more preferably 1 to 6, and s is more preferably 0 to 1. In the formula (5-1), at least one hydrogen atom of —$(CH_2)_r$— may be substituted with an OH group, and it is more preferable that a hydrogen atom(s) bonded to 1 to 3 carbon atoms be each substituted with an OH group.

More preferable examples of $R^4$ in the formula (2) can include a group represented by formula (5-2):

—OCH$_2$CH(OH)CH$_2$O—(CH$_2$)$_t$—  (5-2)

In the formula (5-2), t is preferably 0 or 1.

$R^3$ in the formula (2) is a hydrogen atom or a $C_1$-$C_2$ hydrocarbon group. The $C_1$-$C_2$ hydrocarbon group is not particularly limited, and is more preferably an alkyl group. Examples of the alkyl group include a methyl group and an ethyl group.

In the formula (2), when $R^3$ is a hydrogen atom, q may be an integer of 2 to 10, and is more preferably 2 to 8. When $R^3$ is a $C_1$-$C_2$ hydrocarbon group, q may be an integer of 1 to 10, and is more preferably 1 to 4. $R^3$ is preferably a hydrocarbon group from the viewpoint of ease of availability of a material and a material price.

In the formula (1), $R^2$ is a group having the structure represented by the formula (2) or a group having the structure represented by the formula (3). The group having the structure represented by the formula (2) is as described above, and the description thereof will be omitted.

$R^5$ in the formula (3) is a $C_3$-$C_{10}$ hydrocarbon group having an OH group, and at least one carbon atom in a main chain of the $C_3$-$C_{10}$ hydrocarbon group is optionally substituted with an oxygen atom.

The $C_3$-$C_{10}$ hydrocarbon group may be a linear hydrocarbon group or a branched hydrocarbon group. Further, the $C_3$-$C_{10}$ hydrocarbon group may be a saturated or an unsaturated hydrocarbon group, and is more preferably a saturated hydrocarbon group. The lower limit of the number of carbon atoms in the $C_3$-$C_{10}$ hydrocarbon group may be 3, and is more preferably 4. Further, the upper limit of the number of carbon atoms in the $C_3$-$C_{10}$ hydrocarbon group may be 10, and is more preferably 9, and even more preferably 8.

$R^5$ in the formula (3) has an OH group. It is therefore possible to further enhance the interaction between the perfluoropolyether compound and a magnetic disk. The number of OH groups contained in $R^5$ is preferably 1 to 5. The upper limit of the number of OH groups contained in $R^5$ is more preferably 4, and still more preferably 2. It is preferable that the number of OH groups contained in $R^5$ be not more than 5 because favorable solubility in a fluorine-based solvent is achieved.

The OH group contained in $R^5$ may be any of a primary OH group, a secondary OH group, and a tertiary OH group or a combination of two or more of these OH groups. The OH group contained in $R^4$ more preferably contains a secondary OH group from the viewpoint of being able to be easily produced at a high yield. The OH group contained in $R^5$ preferably contains a primary OH group from the viewpoint of enhancing the interaction between the perfluoropolyether compound and a magnetic disk. The OH group contained in $R^5$ can be only a secondary OH group or a combination of a secondary OH group and at least one of a primary OH group and a tertiary OH group. The number of secondary OH groups contained in $R^5$ is preferably 1 to 5. The upper limit of the number of secondary OH groups contained in $R^5$ is more preferably 4, and still more preferably 2. It is preferable that the number of secondary OH groups contained in $R^5$ be not more than 5 because favorable solubility in a fluorine-based solvent is achieved.

The secondary OH group may be bonded to a carbon atom in the main chain of the hydrocarbon group constituting $R^5$. In a case where $R^5$ has a side chain, the secondary OH group may be bonded to the side chain. The secondary OH group is more preferably bonded to the carbon atom in the main chain of the hydrocarbon group constituting $R^5$ from the viewpoint of being able to be easily produced at a high yield.

In a case where the OH group is a primary OH group, the primary OH group can be contained in the form of an OH group in a hydroxyalkyl group bonded to a carbon atom in the main chain of the hydrocarbon group or in the side chain thereof. Examples of the hydroxyalkyl group include, but are not limited to, a hydroxymethyl group, a hydroxyethyl group, a hydroxypropyl group, and the like.

At least one carbon atom in the main chain of the hydrocarbon group is optionally substituted with an oxygen atom. The number of oxygen atoms with which the carbon atom(s) in the main chain is/are substituted, that is, the number of ether groups contained in the main chain, is 1 to 5, and more preferably 1 to 3.

$R^5$ in the formula (3) may have the above-described configuration. More preferable examples of $R^5$ in the formula (3) can include a group having a structure represented by formula (6):

—(OCH$_2$CH(OH)—CH$_2$)$_u$  (6)

In the formula (6), u is preferably 1 to 2, and more preferably 2. In the formula (6), although not substituted, the hydrocarbon group as the main chain is optionally substituted with an alkyl group having 1 to 10 carbon atoms.

More specific examples of $R^5$ in the formula (3) can include —OCH$_2$CH(OH)CH$_2$— and —OCH$_2$CH(OH)CH$_2$OCH$_2$CH(OH)CH$_2$—.

In the formula (1), p is 0 or 1. That is, the perfluoropolyether compound in accordance with an aspect of the present invention may be a perfluoropolyether compound having one perfluoropolyether group in a molecule or a perfluoropolyether compound having two perfluoropolyether groups in the molecule.

L in the formula (1) is a linking group being composed of a $C_3$-$C_{20}$ hydrocarbon group having an OH group, at least one carbon atom in a main chain of the $C_3$-$C_{20}$ hydrocarbon group is optionally substituted with an oxygen atom. The $C_3$-$C_{20}$ hydrocarbon group may be a linear hydrocarbon group or a branched hydrocarbon group. Further, the $C_3$-$C_{20}$ hydrocarbon group may be a saturated or an unsaturated hydrocarbon group, and is more preferably a saturated hydrocarbon group. The lower limit of the number of carbon atoms in the $C_3$-$C_{20}$ hydrocarbon group may be 3, and is more preferably 5, and even more preferably 7. Further, the upper limit of the number of carbon atoms in the $C_3$-$C_{20}$ hydrocarbon group may be 20, and is more preferably 18, and even more preferably 16.

L in the formula (1) has an OH group. It is therefore possible to further enhance the interaction between the perfluoropolyether compound and a magnetic disk. The number of OH groups contained in L is preferably 1 to 5. The upper limit of the number of OH groups contained in L is more preferably 4, and still more preferably 3. It is preferable that the number of OH groups contained in L be not more than 5 because favorable solubility in a fluorine-based solvent is achieved.

The OH group contained in L may be any of a primary OH group, a secondary OH group, and a tertiary OH group or a combination of two or more of these OH groups. The OH group contained in L more preferably contains a secondary OH group from the viewpoint of being able to be easily produced at a high yield. The OH group contained in L more preferably contains a primary OH group from the viewpoint of enhancing the interaction between the perfluoropolyether compound and a magnetic disk. The OH group contained in L can be only a secondary OH group or a combination of a secondary OH group and at least one of a primary OH group and a tertiary OH group. The number of secondary OH groups contained in L is preferably 1 to 5. The upper limit of the number of secondary OH groups contained in L is more preferably 4, and still more preferably 2. It is preferable that the number of secondary OH groups contained in L be not more than 3 because favorable solubility in a fluorine-based solvent is achieved.

The secondary OH group may be bonded to a carbon atom in the main chain of the hydrocarbon group constituting L. In a case where L has a side chain, the secondary OH group may be bonded to the side chain. The secondary OH group is more preferably bonded to the carbon atom in the main chain of the hydrocarbon group constituting L from the viewpoint of being able to be easily produced at a high yield.

In a case where the OH group is a primary OH group, the primary OH group can be contained in the form of an OH group in a hydroxyalkyl group bonded to a carbon atom in the main chain of the hydrocarbon group or in the side chain thereof. Examples of the hydroxyalkyl group include, but are not limited to, a hydroxymethyl group, a hydroxyethyl group, a hydroxypropyl group, and the like.

At least one carbon atom in the main chain of the hydrocarbon group is optionally substituted with an oxygen atom. The number of oxygen atoms with which the carbon atom(s) in the main chain is/are substituted, that is, the number of ether groups contained in the main chain, is 1 to 10, and more preferably 2 to 4.

L in the formula (1) may have the above-described configuration. More preferable examples of L in the formula (1) can include a linking group represented by formula (7):

$$-CH_2-O-CH_2-(CH(OH)-CH_2-O-CH_2)_g- \quad (7)$$

In the formula (7), g is preferably 1 to 5, more preferably 1 to 3, and even more preferably 3. In the formula (7), one or some of the OH groups is/are optionally substituted with at least one group selected from a hydroxymethyl group, a hydroxyethyl group, a hydroxypropyl group, and the like. In the formula (7), although not substituted, the hydrocarbon group as the main chain is optionally substituted with an alkyl group having 1 to 10 carbon atoms.

The number average molecular weight of each of the perfluoropolyether groups in the perfluoropolyether compound in accordance with an embodiment of the present invention is preferably 200 to 5000, and more preferably 800 to 1500. Note, here, that the number average molecular weight is a value measured by $^{19}$F-NMR with use of JNM-ECX400 available from JEOL Ltd. In the NMR measurement, a sample is used as a neat solution without being diluted. A known peak that indicates a part of a skeleton structure of fluoropolyether is used as a reference for a chemical shift.

The perfluoropolyether groups are each a compound having a molecular weight distribution, and has a molecular weight distribution (PD), represented by weight average molecular weight/number average molecular weight, of typically 1.0 to 1.5, more preferably 1.0 to 1.3, and even more preferably 1.0 to 1.1. Note that the molecular weight distribution is a value obtained with use of HPLC-8220GPC available from Tosoh Corporation, a column (PLgel Mixed E) available from Polymer Laboratories, an HCFC-based substitute for CFCs as an eluent, and a non-functional perfluoropolyether as a reference substance.

The perfluoropolyether compound in accordance with an embodiment of the present invention can contain any combination of $R^1$, $R^2$, L, and p, which have been described above, and Rf represented by the foregoing formula (4).

More specific examples of the perfluoropolyether compound in accordance with an embodiment of the present invention can include respective compounds represented by the following formulas.

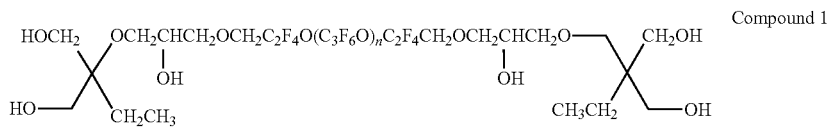

Compound 1

In the compound 1, n is a real number of 1 to 30.

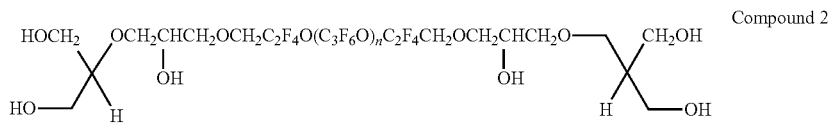

Compound 2

In the compound 2, n is a real number of 1 to 30. Note that the compound 2 differs from the perfluoropolyether compound having the structure represented by the foregoing formula (1) in that q is an integer of 1 when $R^3$ in the formula (2) is a hydrogen atom. However, as will be described later, since a compound having a Demnum skeleton has high heat resistance, the compound 2 in which a perfluoropolyether group of Rf is a Demnum skeleton has high heat resistance. Therefore, the compound 2 is also included in the perfluoropolyether compound that attains the object of having excellent heat resistance, exhibiting a strong interaction with a magnetic disk, and having a high degree of solubility in a fluorine-based solvent.

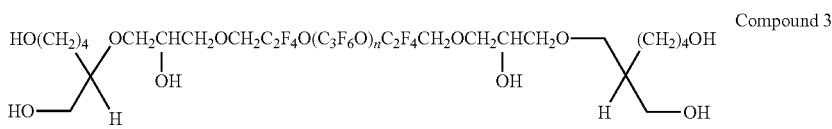

Compound 3

In the compound 3, n is a real number of 1 to 30.

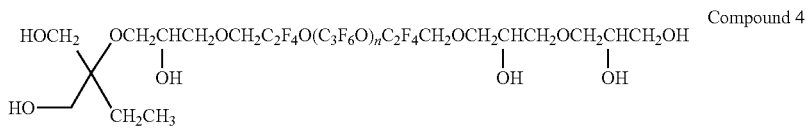

Compound 4

In the compound 4, n is a real number of 1 to 30.

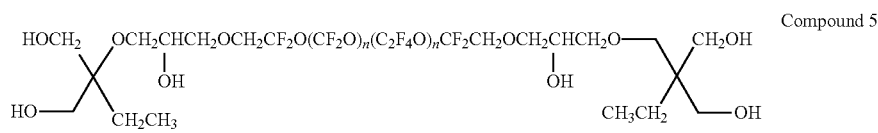

Compound 5

In the compound 5, n is a real number of 1 to 30.

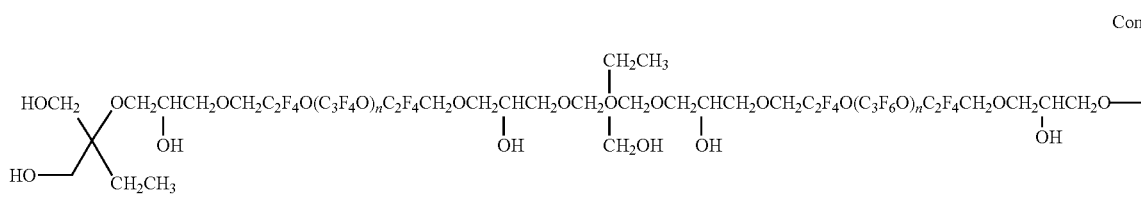

Compound 6

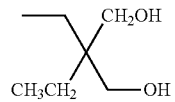

In the compound 6, n is a real number of 1 to 30.

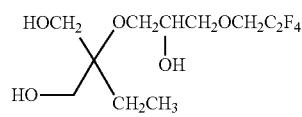

Compound 7

In the compound 7, n is a real number of 1 to 30.

The molecular weight of the perfluoropolyether compound is preferably 2000, and more preferably 1500.

2. Method for Producing Perfluoropolyether Compound

A method for producing a perfluoropolyether compound in accordance with an embodiment of the present invention is not particularly limited, provided that the method is a method which enables production of a perfluoropolyether compound having the structure represented by the foregoing formula (1). For example, the compound 1 can be produced by reacting perfluoropolyether and a compound obtained by epoxidizing trimethylolpropane in a solvent such as t-butyl alcohol in the presence of a reaction accelerator such as potassium t-butoxide. Here, the compound obtained by epoxidizing trimethylolpropane can be produced by, for example, allowing a compound, as a raw material, containing two or more primary OH groups and having three or more OH groups (for example, trimethylolpropane, 2-hydroxymethyl-1,3-propanediol, or the like) to be acted on by epichlorohydrin or epibromohydrin in the presence of a base, and then purifying a resulting product by column chromatography.

In accordance with $R^1$ and $R^2$ in the foregoing formula (1), a compound having an epoxide structure at terminals of $R^1$ and $R^2$ is used instead of the compound obtained by epoxidizing trimethylolpropane.

Further, in a case where p in the foregoing formula (1) is 1, two primary OH groups and one secondary OH group are introduced at one terminal of perfluoropolyether by reacting the one terminal of perfluoropolyether with a compound obtained by epoxidizing trimethylolpropane. After that, the other terminal of perfluoropolyether is reacted with a compound containing two reaction points with respect to an OH group, such as a diepoxy compound or epihalohydrin, under a basic condition, and a resulting reaction product is purified by column chromatography. In this way, the compound represented by the formula (1), where p is 1, is produced.

A temperature at which perfluoropolyether and the compound having an epoxide structure at the terminals of $R^1$ and $R^2$ are reacted is preferably 50° C. to 120° C., and more preferably 60° C. to 90° C. A reaction time is preferably 1 hour to 96 hours, and preferably 15 hours to 25 hours.

After perfluoropolyether and the compound having an epoxide structure at the terminals of $R^1$ and $R^2$, which are raw materials, have been reacted with each other, for example, a resulting reaction product is washed with water, and dehydrated, and purified by silica gel column chromatography or the like. Consequently, the perfluoropolyether compound in accordance with an embodiment of the present invention can be obtained.

3. Lubricant

A lubricant in accordance with an embodiment of the present invention contains the above-described perfluoropolyether compound in accordance with an embodiment of the present invention. The perfluoropolyether compound can be also used alone as the lubricant. Alternatively, the perfluoropolyether compound and any other component which are mixed at an arbitrary ratio may be used as the lubricant, provided that the performance of the lubricant is not impaired.

Examples of the any other component include: known lubricants for magnetic disks, such as Fomblin (registered trademark) Zdol (available from Solvay Solexis), Ztetraol (available from Solvay Solexis), Demnum (registered trademark) (available from Daikin Industries, Ltd.), and Krytox (registered trademark) (available from DuPont); MORESCO PHOSFAROL A20H (available from MORESCO Corporation); and MORESCO PHOSFAROL D-4OH (available from MORESCO Corporation).

The lubricant can be used as a lubricant for recording media, in order to improve the sliding properties of magnetic disks. The lubricant can also be used as a lubricant for recording media (e.g., magnetic tapes) other than magnetic disks, in recording devices that involve sliding between the recording media and heads. The lubricant can also be used as a lubricant for other apparatuses which have parts that involve sliding, not confined to the recording devices.

4. Magnetic Disk

A magnetic disk 1 in accordance with an embodiment of the present invention includes, as illustrated in FIG. 1, a recording layer 4, a protective film layer (protective layer) 3, and a lubricant layer 2, which are disposed on a non-magnetic substrate 8. The lubricant layer 2 contains the foregoing lubricant.

Figure 2:
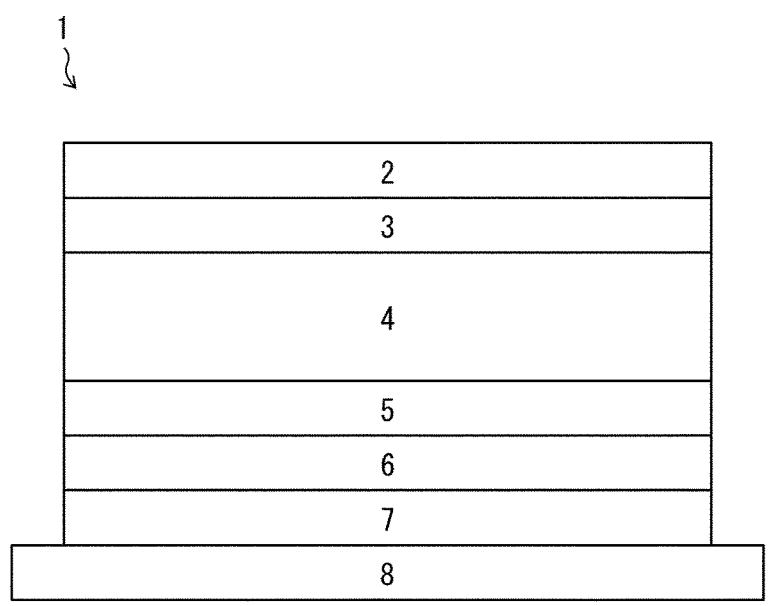
FIG. 2 is a cross-sectional view illustrating a configuration of a magnetic disk in accordance with an embodiment of the present invention.

In another embodiment, the magnetic disk can include, like a magnetic disk 1 illustrated in FIG. 2, a lower layer 5 that underlies the recording layer 4, one or more soft magnetic lower layers 6 that underlie the lower layer 5, and an adhesive layer 7 that underlies the one or more soft magnetic lower layers 6. In an embodiment, all these layers can be formed on the non-magnetic substrate 8.

Each of the layers of the magnetic disk 1, other than the lubricant layer 2, can contain a material that is known in this technical field to be suitable for a corresponding one of layers of a magnetic disk. Examples of the material of the recording layer 4 include: an alloy of an element (e.g., iron, cobalt, and nickel) from which a ferromagnetic material can be formed and chromium, platinum, tantalum or the like; and an oxide of the alloy. Examples of the material of the protective layer 3 include carbon, $Si_3N_4$, SiC, and $SiO_2$. Examples of the material of the non-magnetic substrate 8 include an aluminum alloy, glass, and polycarbonate.

5. Method of Producing Magnetic Disk

A method of producing the magnetic disk in accordance with an aspect of the present invention includes a step of forming a lubricant layer by placing the lubricant in accordance with an embodiment of the present invention on an exposed surface of a protective layer of a stack of a recording layer and the protective layer.

There is no particular limitation on a method of forming the lubricant layer by placing the lubricant on the exposed surface of the protective layer of the stack of the recording layer and the protective layer. It is preferable that the lubricant be placed on the exposed surface of the protective layer by the following method: the lubricant is diluted with a solvent and then placed on the exposed surface. Examples of the solvent include: PF-5060, PF-5080, HFE-7100, and HFE-7200 available from 3M; and Vertrel-XF (registered trademark) available from DuPont. The lubricant diluted with the solvent has a concentration of preferably 0.001 wt % to 1 wt %, more preferably 0.005 wt % to 0.5 wt %, and even more preferably 0.005 wt % to 0.1 wt %. In a case where the concentration of the lubricant diluted with the solvent is 0.005 wt % to 0.1 wt %, it is possible to weaken the interaction between molecules of the lubricant. This makes it easy to form a uniform lubricating film.

The following method may be employed: the recording layer and the protective layer are formed in this order; the lubricant is placed on the exposed surface of the protective layer; and then ultraviolet irradiation or heat treatment is carried out.

The ultraviolet irradiation or heat treatment can form stronger bonds between the lubricant layer and the protective layer and, in turn, prevent the lubricant from evaporating from heat. In a case where the ultraviolet irradiation is carried out, it is preferable to use an ultraviolet ray having a dominant wavelength of 185 nm or 254 nm. In a case where the heat treatment is carried out, the temperature of the heat treatment is preferably 60° C. to 170° C., more preferably 80° C. to 170° C., and even more preferably 80° C. to 150° C.

6. Summation

The present invention includes the following aspects:

<1> A perfluoropolyether compound having a structure represented by formula (1):

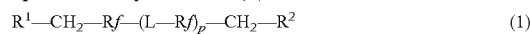

where Rf is a perfluoropolyether group,

L is a linking group being composed of a $C_3$-$C_{20}$ hydrocarbon group having an OH group, at least one carbon atom in a main chain of the $C_3$-$C_{20}$ hydrocarbon group is optionally substituted with an oxygen atom, and p is 0 or 1, and $R^1$ is a group having a structure represented by formula (2):

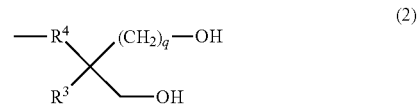

where $R^4$ is a $C_3$-$C_{10}$ hydrocarbon group having an OH group, at least one carbon atom in a main chain of the $C_3$-$C_{10}$ hydrocarbon group is optionally substituted with an oxygen atom, $R^3$ is a hydrogen atom or a $C_1$-$C_2$ hydrocarbon group, q is an integer of 2 to 10 when $R^3$ is a hydrogen atom, and q is an integer of 1 to 10 when $R^3$ is a $C_1$-$C_2$ hydrocarbon group, and $R^2$ is a group having the structure represented by the formula (2) or a group having a structure represented by formula (3):

$$—R^5—OH \qquad (3)$$

where $R^5$ is a $C_3$-$C_{10}$ hydrocarbon group having an OH group, and at least one carbon atom in a main chain of the $C_3$-$C_{10}$ hydrocarbon group is optionally substituted with an oxygen atom.

<2> The perfluoropolyether compound described in <1>, wherein, in the formula (2), $R^4$ has a structure represented by formula (5-2):

$$—OCH_2CH(OH)CH_2O—(CH_2)_t— \qquad (5\text{-}2)$$

where t is 0 or 1.

<3> The perfluoropolyether compound described in <1> or <2>, wherein, in the formula (3), $R^5$ is —OCH$_2$CH(OH)CH$_2$— or —OCH$_2$CH(OH)CH$_2$OCH$_2$CH(OH)CH$_2$—.

<4> The perfluoropolyether compound described in any of <1> to <3>, wherein, in the formula (1), L has a structure represented by formula (7):

$$—CH_2—O—CH_2—(CH(OH)—CH_2—O—CH_2)_g— \qquad (7)$$

where g is an integer of 1 to 5, an OH group is optionally substituted with at least one group selected from a hydroxymethyl group, a hydroxyethyl group, a and hydroxypropyl group, and a hydrogen atom bonded to carbon is optionally substituted with an alkyl group having 1 to 10 carbon atoms.

<5> A perfluoropolyether compound having a structure represented by the following formula:

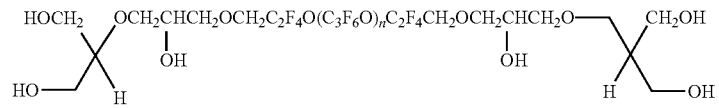

where n is a real number of 1 to 30.
<6> A lubricant including a perfluoropolyether compound described in any of <1> to <5>.
<7> A magnetic disk including: a recording layer; a protective layer disposed on the recording layer; and a lubricant layer disposed on the protective layer, the lubricant layer containing a lubricant described in <6>.

EXAMPLES

The present invention will be described below in more detail with reference to Examples. Note, however, that the present invention is not limited to such Examples.

Evaluation Method

Heat Resistance

The heat resistance of each lubricant was evaluated by a thermogravimetric analyzer (EXSTAR6000, available from Seiko Instruments Inc.). 5 mg of each perfluoropolyether compound obtained in Examples and Comparative Examples was placed in a container made of platinum. The container was then heated to 550° C. at a rate of temperature rise of 2° C./min under a nitrogen atmosphere. A 50% weight reduction temperature (T50) was measured, and the heat resistance was evaluated.

Solubility in Fluorine-based Solvent 0.03 g of each of the perfluoropolyether compounds obtained in Examples and Comparative Examples was weighed out, and Vertrel-XF (available from Chemours-Mitsui Fluoroproducts Co., Ltd.) was added thereto so that a resulting solution weighed 30 g. After the solution was stirred hard, solubility in a fluorine-based solvent was evaluated. The solution was visually checked. In a case where the solution was transparent, the perfluoropolyether compound was rated as "good". In a case where the solution was cloudy, the perfluoropolyether compound was rated as "poor".

Bonding Ratio

Each of the perfluoropolyether compounds obtained in Examples and Comparative Examples was dissolved in Vertrel-XF. A resulting solution was applied on a magnetic disk by a dip method so that the film thickness of the lubricant would become αÅ. FT-IR (VERTEX70, available from Bruker) was used to measure the film thickness of the lubricant. After the magnetic disk had been allowed to stand still for two weeks, the magnetic disk was immersed in Vertrel-XF again to wash out a lubricant which has a weak interaction with the magnetic disk. The film thickness of the lubricant remaining on the magnetic disk washed with Vertrel-XF was measured by FT-IR. The film thickness at this time was denoted as βÅ. In order to quantify an interaction with a disk, a bonding ratio was calculated as β/α×100 (%).

Example 1

A compound 1 was synthesized as below. The compound 1 thus obtained was used as a lubricant of Example 1.
A mixture of t-butyl alcohol (65 g), perfluoropolyether (100 g) represented by $HOCH_2CF_2CF_2O(CF_2CF_2CF_2O)$ $nCF_2CF_2CH_2OH$, potassium t-butoxide (1.2 g), and a compound (51 g) obtained by epoxidizing trimethylolpropane was stirred at 70° C. for 20 hours under an argon atmosphere. After that, a resulting reaction product was washed with water, dehydrated, and then purified by silica gel column chromatography. Consequently, 62 g of a perfluoropolyether compound (compound 1) was obtained.
Identification results of the compound 1 by NMR are shown below.
$^{19}F$-NMR (solvent: none, reference substance: —$OCF_2C\underline{F}_2CF_2O$— in the product was regarded as −129.7 ppm)
δ=−129.7 ppm [8F, —$OC\underline{F}_2CF_2O$—]
δ=−84.1 ppm [15F, —$OC\underline{F}_2CF_2C\underline{F}_2O$—]
δ=−124.0 ppm [4F, —$OC\underline{F}_2C\underline{F}_2CH_2OCH_2CH(OH)$ $CH_2OCH_2C(CH_2CH_3)(CH_2OH)C\underline{H}_2OH$]
δ=−86.4 ppm [4F, —$OC\underline{F}_2CF_2CH_2OCH_2CH(OH)$ $CH_2OCH_2C(CH_2CH_3)(CH_2O\underline{H})CH_2OH$]
$^1H$-NMR (solvent: none, reference substance: $D_2O$)
δ=0.7 ppm [6H, $HOCH_2C(CH_2OH)(CH_2C\underline{H}_3)$ $CH_2OCH_2CH(OH)CH_2OCH_2CF_2CF_2O$ $(CF_2CF_2CF_2O)mCF_2CF_2CH_2OCH_2CH(OH)$ $CH_2OCH_2C(CH_2CH_3)(CH_2OH)CH_2OH$]
δ=1.2 ppm [4H, $HOCH_2C(CH_2OH)(C\underline{H}_2CH_3)$ $CH_2OCH_2CH(OH)CH_2OCH_2CF_2CF_2O$ $(CF_2CF_2CF_2O)mCF_2CF_2CH_2OCH_2CH(OH)$ $CH_2OCH_2C(CH_2CH_3)(CH_2OH)CH_2OH$]
δ=3.2 ppm to 4.0 ppm [32H, $\underline{HOCH_2}C(C\underline{H_2OH})$ $(CH_2CH_3)C\underline{H_2}OC\underline{H_2}C\underline{H}(O\underline{H})C\underline{H_2}OC\underline{H_2}CF_2CF_2O$ $(CF_2CF_2CF_2\underline{O})mCF_2C\underline{F_2}OC\underline{H_2}C\underline{H}(O\underline{H})$ $C\underline{H_2}OC\underline{H_2}C(CH_2CH_3)(C\underline{H_2}O\underline{H})C\underline{H_2}O\underline{H}$]
As a result of $^{19}F$-NMR and $^1H$-NMR, it was shown that the compound 1 is a compound in which n=4 in the formula.

Example 2

A compound 2 was synthesized as below. The compound 2 thus obtained was used as a lubricant of Example 2.
A mixture of t-butyl alcohol, perfluoropolyether represented by $HOCH_2CF_2CF_2O(CF_2CF_2CF_2O)$ $nCF_2CF_2CH_2OH$, potassium t-butoxide, and a compound obtained by epoxidizing 2-hydroxymethyl-1,3-propanediol was stirred at 70° C. for 20 hours under an argon atmosphere. After that, a resulting reaction product was washed with water, dehydrated, and then purified by silica gel column chromatography. Consequently, a perfluoropolyether compound (compound 2) was obtained.

Example 3

A compound 3 was synthesized as below. The compound 3 thus obtained was used as a lubricant of Example 3.
A mixture of t-butyl alcohol (65 g), perfluoropolyether (100 g) represented by $HOCH_2CF_2CF_2O(CF_2CF_2CF_2O)$ $nCF_2CF_2CH_2OH$, potassium t-butoxide (1.2 g), and a compound (51 g) obtained by epoxidizing 1,2,6-hexanetriol was stirred at 70° C. for 20 hours under an argon atmosphere. After that, a resulting reaction product was washed with water, dehydrated, and then purified by silica gel column chromatography. Consequently, 60 g of a perfluoropolyether compound (compound 3) was obtained.
Identification results of the compound 3 by NMR are shown below.
$^{19}F$-NMR (solvent: none, reference substance: —$OCF_2C\underline{F}_2CF_2O$— in the product was regarded as −129.7 ppm)
δ=−129.7 ppm [8F, —$OC\underline{F}_2CF_2O$—]
δ=−84.0 ppm [16F, —$OC\underline{F}_2CF_2C\underline{F}_2O$—]

δ=−123.9 ppm [4F, —OCF$_2$CF$_2$CH$_2$OCH$_2$CH(OH)CH$_2$OCH(CH$_2$OH)CH$_2$CH$_2$CH$_2$CH$_2$OH]

δ=−86.1 ppm [4F, —OCF$_2$CF$_2$CH$_2$OCH$_2$CH(OH)CH$_2$OCH(CH$_2$OH)CH$_2$CH$_2$CH$_2$CH$_2$OH]

$^1$H-NMR (solvent: none, reference substance: D$_2$O)

δ=0.9 ppm to 1.2 ppm [12H, HOCH$_2$CH$_2$CH$_2$CH$_2$CH(CH$_2$OH)OCH$_2$CH(OH)CH$_2$OCH$_2$CF$_2$CF$_2$O(CF$_2$CF$_2$CF$_2$O)nCF$_2$CF$_2$CH$_2$OCH$_2$CH(OH)CH$_2$OCH(CH$_2$OH)CH$_2$CH$_2$CH$_2$CH$_2$OH]

δ=1.2 ppm [30H, HOCH$_2$CH$_2$CH$_2$CH$_2$CH(CH$_2$OH)OCH$_2$CH(OH)CH$_2$OCH$_2$CF$_2$CF$_2$O(CF$_2$CF$_2$CF$_2$O)nCF$_2$CF$_2$CH$_2$OCH$_2$CH(OH)CH$_2$OCH(CH$_2$OH)CH$_2$CH$_2$CH$_2$CH$_2$OH]

As a result of $^{19}$F-NMR and $^1$H-NMR, it was shown that the compound 3 is a compound in which n=5 in the formula.

Example 4

A compound 4 was synthesized as below. The compound 4 thus obtained was used as a lubricant of Example 4.

A mixture of t-butyl alcohol, perfluoropolyether represented by HOCH$_2$CF$_2$CF$_2$O(CF$_2$CF$_2$CF$_2$O)nCF$_2$CF$_2$CH$_2$OH, potassium t-butoxide, and glycidol was stirred at 70° C. for 20 hours under an argon atmosphere. After that, a resulting reaction product was washed with water, dehydrated, and then purified by silica gel column chromatography. Consequently, a compound in which perfluoropolyether has one hydroxyl group at one terminal thereof and three hydroxyl groups at the other terminal thereof was obtained. The compound thus obtained was mixed with t-butyl alcohol, potassium t-butoxide, and a compound obtained by epoxidizing trimethylolpropane under an argon atmosphere, and a resulting mixture was stirred at 70° C. for 20 hours. After that, a resulting reaction product was purified by column chromatography. Consequently, a perfluoropolyether compound (compound 4) was obtained.

Example 5

A compound 5 was synthesized as below. The compound 5 thus obtained was used as a lubricant of Example 5.

A mixture of t-butyl alcohol (65 g), perfluoropolyether (100 by g) represented by HOCH$_2$CF$_2$O(CF$_2$CF$_2$O)n(CF$_2$O)nCF$_2$CH$_2$OH, potassium t-butoxide (1.2 g), and a compound (51 g) obtained by epoxidizing trimethylolpropane was stirred at 70° C. for 20 hours under an argon atmosphere. After that, a resulting reaction product was washed with water, dehydrated, and then purified by silica gel column chromatography. Consequently, 65 g of a perfluoropolyether compound (compound 5) was obtained.

Identification results of the compound 5 by NMR are shown below.

$^{19}$F-NMR (solvent: none, reference substance: —OCF$_2$CF$_2$O— in the product was regarded as −90.7 ppm)

δ=−90.7 ppm [16F, —OCF$_2$CF$_2$O—]

δ=−52.1 ppm [10F, —OCF$_2$O—]

δ=−79.8 ppm [4F, —OCF$_2$CH$_2$OCH$_2$CH(OH)CH$_2$OCH$_2$C(CH$_2$CH$_3$)(CH$_2$OH)CH$_2$OH]

$^1$H-NMR (solvent: none, reference substance: D$_2$O)

δ0.7 ppm [6H, HOCH$_2$C(CH$_2$OH)(CH$_2$CH$_3$)CH$_2$OCH$_2$CH(OH)CH$_2$OCH$_2$CF$_2$O(CF$_2$CF$_2$O)n(CF$_2$O)nCF$_2$CH$_2$OCH$_2$CH(OH)CH$_2$OCH$_2$C(CH$_2$CH$_3$)(CH$_2$OH)CH$_2$OH]

δ1.2 ppm [4H, HOCH$_2$C(CH$_2$OH)(CH$_2$CH$_3$)CH$_2$OCH$_2$CH(OH)CH$_2$OCH$_2$CF$_2$O(CF$_2$CF$_2$O)n(CF$_2$O)nCF$_2$CH$_2$OCH$_2$CH(OH)CH$_2$OCH$_2$C(CH$_2$CH$_3$)(CH$_2$OH)CH$_2$OH]

δ=3.2 ppm to 4.0 ppm [32H, HOCH$_2$C(CH$_2$OH)(CH$_2$CH$_3$)CH$_2$OCH$_2$CH(OH)CH$_2$OCH$_2$CF$_2$O(CF$_2$CF$_2$O)n(CF$_2$O)nCF$_2$CH$_2$OCH$_2$CH(OH)CH$_2$OCH$_2$C(CH$_2$CH$_3$)(CH$_2$OH)CH$_2$OH]

As a result of $^{19}$F-NMR and $^1$H-NMR, it was shown that the compound 5 is a compound in which n=5 in the formula.

Example 6

A compound 6 was synthesized as below. The compound 6 thus obtained was used as a lubricant of Example 6.

A mixture of t-butyl alcohol (65 g), perfluoropolyether (100 g) represented by HOCH$_2$CF$_2$CF$_2$O(CF$_2$CF$_2$CF$_2$O)nCF$_2$CF$_2$CH$_2$OH, potassium t-butoxide (0.6 g), and a compound (24 g) obtained by epoxidizing trimethylolpropane was stirred at 70° C. for 20 hours under an argon atmosphere. After that, a resulting reaction product was washed with water, dehydrated, and then purified by silica gel column chromatography. Consequently, 40 g of a compound in which perfluoropolyether has one hydroxyl group at one terminal thereof and three hydroxyl groups at the other terminal thereof was obtained. After that, the compound thus obtained was mixed with t-butyl alcohol (25 g), potassium t-butoxide (0.5 g), and a compound (20 g) obtained by diepoxidizing trimethylolpropane under an argon atmosphere, and a resulting mixture was stirred at 70° C. for 20 hours. After that, a resulting reaction product was purified by column chromatography. Consequently, 15 g of a perfluoropolyether compound (compound 6) was obtained.

Identification results of the compound 6 by NMR are shown below.

$^{19}$F-NMR (solvent: none, reference substance: —OCF$_2$CF$_2$CF$_2$O— in the product was regarded as −129.7 ppm)

δ=−129.7 ppm [16F, —OCF$_2$CF$_2$CF$_2$O—]

δ=−84.1 ppm [32F, —OCF$_2$CF$_2$CF$_2$O—]

δ=−124.0 ppm [8F, —OCF$_2$CF$_2$CH$_2$OCH$_2$CH(OH)CH$_2$OCH$_2$C(CH$_2$CH$_3$)(CH$_2$OH)CH$_2$OH, —OCF$_2$CF$_2$CH$_2$OCH$_2$CH(OH)CH$_2$OCH$_2$C(CH$_2$OH)(CH$_2$CH$_3$)CH$_2$OCH$_2$CH(OH)CH$_2$OCH$_2$CF$_2$CF$_2$—]

δ=−86.4 ppm [8F, —OCF$_2$CF$_2$CH$_2$OCH$_2$CH(OH)CH$_2$OCH$_2$C(CH$_2$CH$_3$)(CH$_2$OH)CH$_2$OH, —OCF$_2$CF$_2$CH$_2$OCH$_2$CH(OH)CH$_2$OCH$_2$C(CH$_2$OH)(CH$_2$CH$_3$)CH$_2$OCH$_2$CH(OH)CH$_2$OCH$_2$CF$_2$CF$_2$—]

$^1$H-NMR (solvent: none, reference substance: D$_2$O)

δ=0.7 ppm [9H, —OCF$_2$CF$_2$CH$_2$OCH$_2$CH(OH)CH$_2$OCH$_2$C(CH$_2$CH$_3$)(CH$_2$OH)CH$_2$OH, —OCF$_2$CF$_2$CH$_2$OCH$_2$CH(OH)CH$_2$OCH$_2$C(CH$_2$OH)(CH$_2$CH$_3$)CH$_2$OCH$_2$CH(OH)CH$_2$OCH$_2$CF$_2$CF$_2$—]

δ=1.2 ppm [6H, —OCF$_2$CF$_2$CH$_2$OCH$_2$CH(OH)CH$_2$OCH$_2$C(CH$_2$CH$_3$)(CH$_2$OH)CH$_2$OH, —OCF$_2$CF$_2$CH$_2$OCH$_2$CH(OH)CH$_2$OCH$_2$C(CH$_2$OH)(CH$_2$CH$_3$)CH$_2$OCH$_2$CH(OH)CH$_2$OCH$_2$CF$_2$CF$_2$—]

δ=3.2 ppm to 4.0 ppm [55H, HOCH$_2$C(CH$_2$OH)(CH$_2$CH$_3$)CH$_2$OCH$_2$CH(OH)CH$_2$OCH$_2$CF$_2$CF$_2$O(CF$_2$CF$_2$CF$_2$O)mCF$_2$CF$_2$CH$_2$OCH$_2$CH(OH)CH$_2$OCH$_2$C(CH$_2$OH)(CH$_2$CH$_3$)CH$_2$OCH$_2$CH(OH)CH$_2$OCH$_2$CF$_2$CF$_2$O(CF$_2$CF$_2$CF$_2$O)mCF$_2$CF$_2$CH$_2$OCH$_2$CH(OH)CH$_2$OCH$_2$C(CH$_2$CH$_3$)(CH$_2$OH)CH$_2$OH]

As a result of $^{19}$F-NMR and $^1$H-NMR, it was shown that the compound 6 is a compound in which n=5 in the formula.

Example 7

A compound 7 was synthesized as below. The compound 7 thus obtained was used as a lubricant of Example 7.

A mixture of t-butyl alcohol (65 g), perfluoropolyether (100 g) represented by $HOCH_2CF_2CF_2O(CF_2CF_2CF_2O)nCF_2CF_2CH_2OH$, potassium t-butoxide (0.6 g), and a compound (24 g) obtained by epoxidizing trimethylolpropane was stirred at 70° C. for 20 hours under an argon atmosphere. After that, a resulting reaction product was washed with water, dehydrated, and then purified by silica gel column chromatography. Consequently, 40 g of a compound in which perfluoropolyether has one hydroxyl group at one terminal thereof and three hydroxyl groups at the other terminal thereof was obtained. After that, the compound thus obtained was mixed with t-butyl alcohol (25 g), potassium t-butoxide (0.5 g), and epibromohydrin (8 g) under an argon atmosphere, and a resulting mixture was stirred at 70° C. for 20 hours. After that, a resulting reaction product was purified by column chromatography. Consequently, 17 g of a perfluoropolyether compound (compound 7) was obtained.

Identification results of the compound 7 by NMR are shown below.

$^{19}F$-NMR (solvent: none, reference substance: $-OCF_2CF_2CF_2O-$ in the product was regarded as $-129.7$ ppm)

$\delta = -129.7$ ppm [16F, $-OCF_2\underline{CF_2}CF_2O-$]
$\delta = -84.1$ ppm [32F, $-O\underline{CF_2}CF_2\underline{CF_2}O-$]
$\delta = -124.0$ ppm [8F, $-O\underline{CF_2}CF_2CH_2OCH_2CH(OH)CH_2OCH_2C(CH_2CH_3)(CH_2OH)CH_2OH$,
$-OCF_2\underline{CF_2}CH_2OCH_2CH(OH)CH_2OCH_2\underline{CF_2}CF_2-$]
$\delta = -86.4$ ppm [8F, $-O\underline{CF_2}CF_2CH_2OCH_2CH(OH)CH_2OCH_2C(CH_2CH_3)(CH_2OH)CH_2OH$,
$-OCF_2CF_2CH_2OCH_2CH(OH)CH_2OCH_2CF_2\underline{CF_2}-$]

$^1H$-NMR (solvent: none, reference substance: $D_2O$)
$\delta = 0.7$ ppm [6H, $-OCF_2CF_2CH_2OCH_2CH(OH)CH_2OCH_2C(CH_2\underline{CH_3})(CH_2OH)CH_2OH$]
$\delta = 1.2$ ppm [4H, $-OCF_2CF_2CH_2OCH_2CH(OH)CH_2OCH_2C(\underline{CH_2}CH_3)(CH_2OH)CH_2OH$]
$\delta = 3.2$ ppm to 4.0 ppm [42H, $HO\underline{CH_2}C(\underline{CH_2}OH)(CH_2CH_3)\underline{CH_2}O\underline{CH_2}\underline{CH}(OH)\underline{CH_2}O\underline{CH_2}\underline{CF_2}CF_2O(CF_2CF_2CF_2O)m\underline{CF_2}\underline{CF_2}\underline{CH_2}O\underline{CH_2}\underline{CH}(O\underline{H})\underline{CH_2}O\underline{CH_2}CF_2CF_2O(CF_2CF_2CF_2O)m\underline{CF_2}CF_2\underline{CH_2}O\underline{CH_2}\underline{CH}(OH)\underline{CH_2}O\underline{CH_2}C(CH_2CH_3)(\underline{CH_2}OH)\underline{CH_2}OH$]

As a result of $^{19}F$-NMR and $^1H$-NMR, it was shown that the compound 7 is a compound in which n=5 in the formula.

Comparative Example 1

A comparative compound 1 was synthesized as below. The comparative compound 1 thus obtained was used as a lubricant of Comparative Example 1.

Comparative compound 1

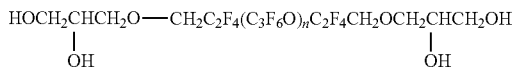

A mixture of t-butyl alcohol (65 g), perfluoropolyether (150 g) represented by $HOCH_2CF_2CF_2O(CF_2CF_2CF_2O)nCF_2CF_2CH_2OH$, potassium t-butoxide (2 g), and glycidol (18 g) was stirred at 70° C. for 18 hours under an argon atmosphere. After that, a resulting reaction product was washed with water, dehydrated, and then purified by silica gel column chromatography. Consequently, 90 g of a perfluoropolyether compound was obtained. The obtained compound was identified by NMR.

As a result of $^{19}F$-NMR and $^1H$-NMR, it was shown that the comparative compound 1 is a compound in which n=6 in the formula.

Comparative Example 2

A comparative compound 2 was synthesized as below. The comparative compound 2 thus obtained was used as a lubricant of Comparative Example 2.

Comparative compound 2

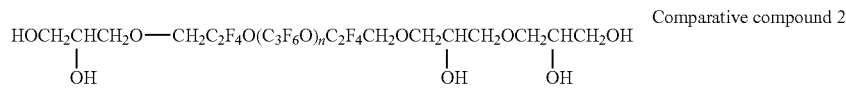

A mixture of t-butyl alcohol (65 g), perfluoropolyether (150 g) represented by $HOCH_2CF_2CF_2O(CF_2CF_2CF_2O)nCF_2CF_2CH_2OH$, potassium t-butoxide (2 g), and glycidol (10 g) was stirred at 70° C. for 17 hours under an argon atmosphere. After that, a resulting reaction product was washed with water, dehydrated, and then purified by silica gel column chromatography. Consequently, 60 g of perfluoropolyether having one hydroxyl group at one terminal thereof and having two hydroxyl groups at the other terminal thereof by reaction with glycidol was obtained.

This 60 g of perfluoropolyether compound was dissolved in t-butyl alcohol (30 g). Then, potassium t-butoxide (1 g) and 2,2-dimethyl-4-(2,3-epoxy)propoxymethyl-1,3-dioxolane (5 g) were added to this solution. A resulting mixture was stirred at 70° C. for 17 hours under an argon atmosphere. After that, a resulting reaction product was washed with water and dehydrated. Then, 100 g of methanol, 11 g of water, and 0.4 g of a 60% nitric acid aqueous solution were added to the reaction product, and a resulting solution was stirred for 39 hours. After that, a resulting reaction product was washed with water, dehydrated, and then purified by distillation to obtain 20 g of perfluoropolyether compound. The obtained compound was identified by NMR.

As a result of $^{19}F$-NMR and $^1H$-NMR, it was shown that the comparative compound 3 is a compound in which n=6 in the formula.

Comparative Example 3

A comparative compound 3 was synthesized as below. The comparative compound 3 thus obtained was used as a lubricant of Comparative Example 3.

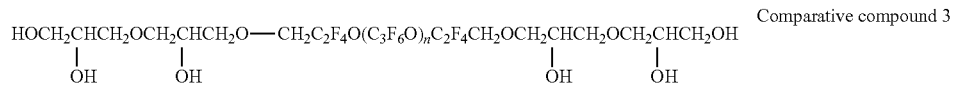

Comparative compound 3

A mixture of t-butyl alcohol (65 g), perfluoropolyether (150 g) represented by HOCH$_2$CF$_2$CF$_2$O(CF$_2$CF$_2$CF$_2$O)nCF$_2$CF$_2$CH$_2$OH, potassium t-butoxide (1 g), and 2,2-dimethyl-4-(2,3-epoxy)propoxymethyl-1,3-dioxolane (23 g) was stirred at 70° C. for 18 hours under an argon atmosphere. After that, a resulting product was washed with water and dehydrated. Then, 100 g of methanol, 11 g of water, and 0.4 g of a 60% nitric acid aqueous solution were added to the dehydrated product, and a resulting solution was stirred for 39 hours. After that, a resulting reaction product was washed with water, dehydrated, and then purified by distillation to obtain 60 g of perfluoropolyether compound. The obtained compound was identified by NMR.

As a result of $^{19}$F-NMR and $^1$H-NMR, it was shown that the comparative compound 3 is a compound in which n=6 in the formula.

Evaluation Results

Table 1 shows results of the evaluation of the heat resistance, bonding ratio, and solubility in a fluorine-based solvent of the lubricants obtained in Examples and Comparative Examples. The bonding ratio is an index for indicating the strength of an interaction between a lubricant and a magnetic disk. A higher bonding ratio indicates a stronger interaction. Note that the comparative compound 3 was insoluble in a fluorine-based solvent, and it was thus impossible to apply the comparative compound 3 on a magnetic disk.

TABLE 1

| Perfluoropolyether compound | Solubility in fluorine-based solvent | Heat resistance | Bonding ratio |
|---|---|---|---|
| Compound 1 | Good | Good (332° C.) | Good (40%) |
| Compound 3 | Good | Good (326° C.) | Good (40%) |
| Compound 5 | Good | Good (316° C.) | Good (41%) |
| Compound 6 | Good | Good (352° C.) | Good (51%) |
| Compound 7 | Good | Good (354° C.) | Good (49%) |
| Comparative compound 1 | Good | Poor (270° C.) | Poor (19%) |
| Comparative compound 2 | Good | Poor (295° C.) | Poor (34%) |
| Comparative compound 3 | Poor | Good (328° C.) | — |

From Table 1, it was shown that the perfluoropolyether compounds obtained in Examples, 1, 3, and 5 to 7 are excellent in solubility, heat resistance, and strength of an interaction with a disk in comparison to the comparative compounds 1 to 3. That is, it was shown that a perfluoropolyether compound in accordance with an embodiment of the present invention has excellent adhesion as a lubricant for bringing a magnetic disk into close contact with a protective layer.

It is suggested that the compound 4 in which only one of R$^1$ and R$^2$ has the structure represented by the formula (2) also has similar properties. In addition, comparison between the compound 1 and the compound 5 was made. The compound 1 and the compound 5 have the same R$^1$ and R$^2$. In the compound 1, a perfluoropolyether group of Rf is a Demnum skeleton. In the compound 5, a perfluoropolyether group of Rf is a Fomblin skeleton. As a result of the comparison, it was shown that the compound 1 (Demnum skeleton) has higher heat resistance. From this result, it is suggested that the compound 2 having a Demnum skeleton has higher heat resistance than a compound having a Fomblin skeleton.

INDUSTRIAL APPLICABILITY

A perfluoropolyether compound in accordance with an embodiment of the present invention has a high degree of solubility in a fluorine-based solvent, has high heat resistance, and exhibits a strong interaction with magnetic disks. Therefore, a perfluoropolyether compound in accordance with an embodiment of the present invention can suitably be used as a lubricant for magnetic disks.

REFERENCE SIGNS LIST

1: magnetic disk
2: lubricant layer
3: protective film layer (protective layer)
4: recording layer
5: lower layer
6: soft magnetic lower layer
7: adhesive layer
8: non-magnetic substrate

The invention claimed is:
1. A perfluoropolyether compound having a structure represented by formula (1):

 (1)

where Rf is a perfluoropolyether group,
L is a linking group being composed of a C$_3$-C$_{20}$ hydrocarbon group having an OH group, at least one carbon atom in a main chain of the C$_3$-C$_{20}$ hydrocarbon group is optionally substituted with an oxygen atom, and p is 0, and
R$^1$ is a group having a structure represented by formula (2):

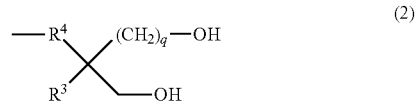 (2)

where R$^4$ is a C$_3$-C$_{10}$ hydrocarbon group having an OH group, at least one carbon atom in a main chain of the C$_3$-C$_{10}$ hydrocarbon group is optionally substituted with an oxygen atom, R$^3$ is a C$_1$-C$_2$ hydrocarbon group, and q is an integer of 1 to 10, and
R$^2$ is a group having the structure represented by the formula (2) or a group having a structure represented by formula (3):

 (3)

where $R^5$ is a $C_3$-$C_{10}$ hydrocarbon group having an OH group, and at least one carbon atom in a main chain of the $C_3$-$C_{10}$ hydrocarbon group is optionally substituted with an oxygen atom.

2. The perfluoropolyether compound according to claim 1, wherein, in the formula (2), $R^4$ has a structure represented by formula (5-2):

$$—OCH_2CH(OH)CH_2O—(CH_2)_t— \qquad (5\text{-}2)$$

where t is 0 or 1.

3. The perfluoropolyether compound according to claim 1, wherein, in the formula (3), $R^5$ is —$OCH_2CH(OH)CH_2$— or —$OCH_2CH(OH)CH_2OCH_2CH(OH)CH_2$—.

4. A lubricant comprising a perfluoropolyether compound recited in claim 1.

5. A magnetic disk comprising: a recording layer; a protective layer disposed on the recording layer; and a lubricant layer disposed on the protective layer, the lubricant layer containing a lubricant recited in claim 4.

6. A perfluoropolyether compound having a structure represented by formula (1):

$$R^1—CH_2—Rf—(L—Rf)_p—CH_2—R^2 \qquad (1)$$

where Rf is a perfluoropolyether group,

L is a linking group being composed of a $C_3$-$C_{20}$ hydrocarbon group having an OH group, at least one carbon atom in a main chain of the $C_3$-$C_{20}$ hydrocarbon group is optionally substituted with an oxygen atom, and p is 1, and $R^1$ is a group having a structure represented by formula (2):

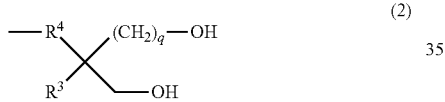

where $R^4$ is a $C_3$-$C_{10}$ hydrocarbon group having an OH group, at least one carbon atom in a main chain of the $C_3$-$C_{10}$ hydrocarbon group is optionally substituted with an oxygen atom, $R^3$ is a hydrogen atom or a $C_1$-$C_2$ hydrocarbon group, and q is an integer of 2 to 10 when $R^3$ is a hydrogen atom, and q is an integer of 1 to 10 when $R^3$ is a $C_1$-$C_2$ hydrocarbon group, and $R^2$ is a group having the structure represented by the formula (2) or a group having a structure represented by formula (3):

$$—R^5—OH \qquad (3)$$

where $R^5$ is a $C_3$-$C_{10}$ hydrocarbon group having an OH group, and at least one carbon atom in a main chain of the $C_3$-$C_{10}$ hydrocarbon group is optionally substituted with an oxygen atom.

7. The perfluoropolyether compound according to claim 6, wherein, in the formula (2), $R^4$ has a structure represented by formula (5-2):

$$—OCH_2CH(OH)CH_2O—(CH_2)_t— \qquad (5\text{-}2)$$

where t is 0 or 1.

8. The perfluoropolyether compound according to claim 6, wherein, in the formula (3), $R^5$ is —$OCH_2CH(OH)CH_2$— or —$OCH_2CH(OH)CH_2OCH_2CH(OH)CH_2$—.

9. A lubricant comprising a perfluoropolyether compound recited in claim 6.

10. A magnetic disk comprising: a recording layer; a protective layer disposed on the recording layer; and a lubricant layer disposed on the protective layer, the lubricant layer containing a lubricant recited in claim 9.

11. A perfluoropolyether compound having a structure represented by formula (1):

$$R^1—CH_2—Rf—(L—Rf)_p—CH_2—R^2 \qquad (1)$$

where Rf is a perfluoropolyether group,

L is a linking group being composed of a $C_3$-$C_{20}$ hydrocarbon group having an OH group, at least one carbon atom in a main chain of the $C_3$-$C_{20}$ hydrocarbon group is optionally substituted with an oxygen atom, and p is 0, and $R^1$ is a group having a structure represented by formula (2):

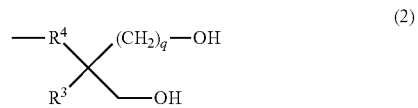

where $R^4$ is a $C_3$-$C_{10}$ hydrocarbon group having an OH group, at least one carbon atom in a main chain of the $C_3$-$C_{10}$ hydrocarbon group is optionally substituted with an oxygen atom, $R^3$ is a hydrogen atom, and q is an integer of 4 to 10, and $R^2$ is a group having the structure represented by the formula (2) or a group having a structure represented by formula (3):

$$—R^5—OH \qquad (3)$$

where $R^5$ is a $C_3$-$C_{10}$ hydrocarbon group having an OH group, and at least one carbon atom in a main chain of the $C_3$-$C_{10}$ hydrocarbon group is optionally substituted with an oxygen atom.

12. The perfluoropolyether compound according to claim 11, wherein, in the formula (2), $R^4$ has a structure represented by formula (5-2):

$$—OCH_2CH(OH)CH_2O—(CH_2)_t— \qquad (5\text{-}2)$$

where t is 0 or 1.

13. The perfluoropolyether compound according to claim 11, wherein, in the formula (3), R5 is —OCH2CH(OH)CH2— or —OCH2CH(OH)CH2OCH2CH(OH)CH2—.

14. A lubricant comprising a perfluoropolyether compound recited in claim 11.

15. A magnetic disk comprising: a recording layer; a protective layer disposed on the recording layer; and a lubricant layer disposed on the protective layer, the lubricant layer containing a lubricant recited in claim 14.

* * * * *